US012602316B1

(12) United States Patent
Chen et al.

(10) Patent No.: US 12,602,316 B1
(45) Date of Patent: Apr. 14, 2026

(54) ARTIFICIAL INTELLIGENCE PROCESSING UNIT ADDRESSING METHOD AND ARTIFICIAL INTELLIGENCE PROCESSING UNIT ADDRESSING SYSTEM CAPABLE OF SEGREGATING AND EXTENDING MEMORY ADDRESS RANGE

(71) Applicant: MEDIATEK INC., Hsinchu City (TW)

(72) Inventors: Yen-Chi Chen, Hsinchu City (TW); Chih-Liang Chia, Hsinchu City (TW); Chuan-Hung Wang, Hsinchu City (TW); Ping-Yi Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/976,261

(22) Filed: Dec. 10, 2024

(51) Int. Cl.
*G06F 12/00* (2006.01)
*G06F 12/02* (2006.01)

(52) U.S. Cl.
CPC .................................. *G06F 12/023* (2013.01)

(58) Field of Classification Search
CPC .............. G06F 12/023; G06F 12/0284; G06F 12/0292; G06F 12/06; G06F 12/08; G06F 12/14; G06F 9/3017; G06F 9/45533; G06F 9/46
See application file for complete search history.

(56) References Cited

U.S. PATENT DOCUMENTS

| | | | |
|---|---|---|---|
| 2008/0005521 A1* | 1/2008 | Cholleti | G06F 12/126 |
| | | | 711/170 |
| 2011/0161620 A1* | 6/2011 | Kaminski | G06F 12/1081 |
| | | | 711/E12.001 |
| 2020/0004993 A1* | 1/2020 | Volos | G06F 21/62 |
| 2025/0004949 A1* | 1/2025 | Blinzer | G06F 12/1009 |

* cited by examiner

*Primary Examiner* — Shawn X Gu
(74) *Attorney, Agent, or Firm* — Winston Hsu

(57) ABSTRACT

An artificial intelligence processing unit (APU) addressing method includes partitioning an APU address range into a reserved address range and an extensible address range, allocating a reserved page table to a micro-processor of the APU for executing a firmware program on the reserved address range, allocating N session page tables to an APU engine of the APU by the micro-processor for executing N runtimes on the extensible address range, and operating a user process of a user terminal by the APU engine of the APU over the N runtimes on the extensible address range. Each runtime corresponds to its own session page table. A runtime is a processing procedure executed by an APU when executing an artificial intelligence (AI) model. N is a positive integer.

20 Claims, 6 Drawing Sheets

Partitioning the APU address range into the reserved address range R1 and the extensible address range R2    S601

Allocating the reserved page table to the micro-processor 11 for executing the firmware program on the reserved address range R1    S602

Allocating N session page tables to the APU engine 10 by the micro-processor 11 for executing N runtimes on the extensible address range R2, wherein each runtime corresponds to its own session page table    S603

Operating the user process of the user terminal 12 by the APU engine 10 over the N runtimes on the extensible address range R2    S604

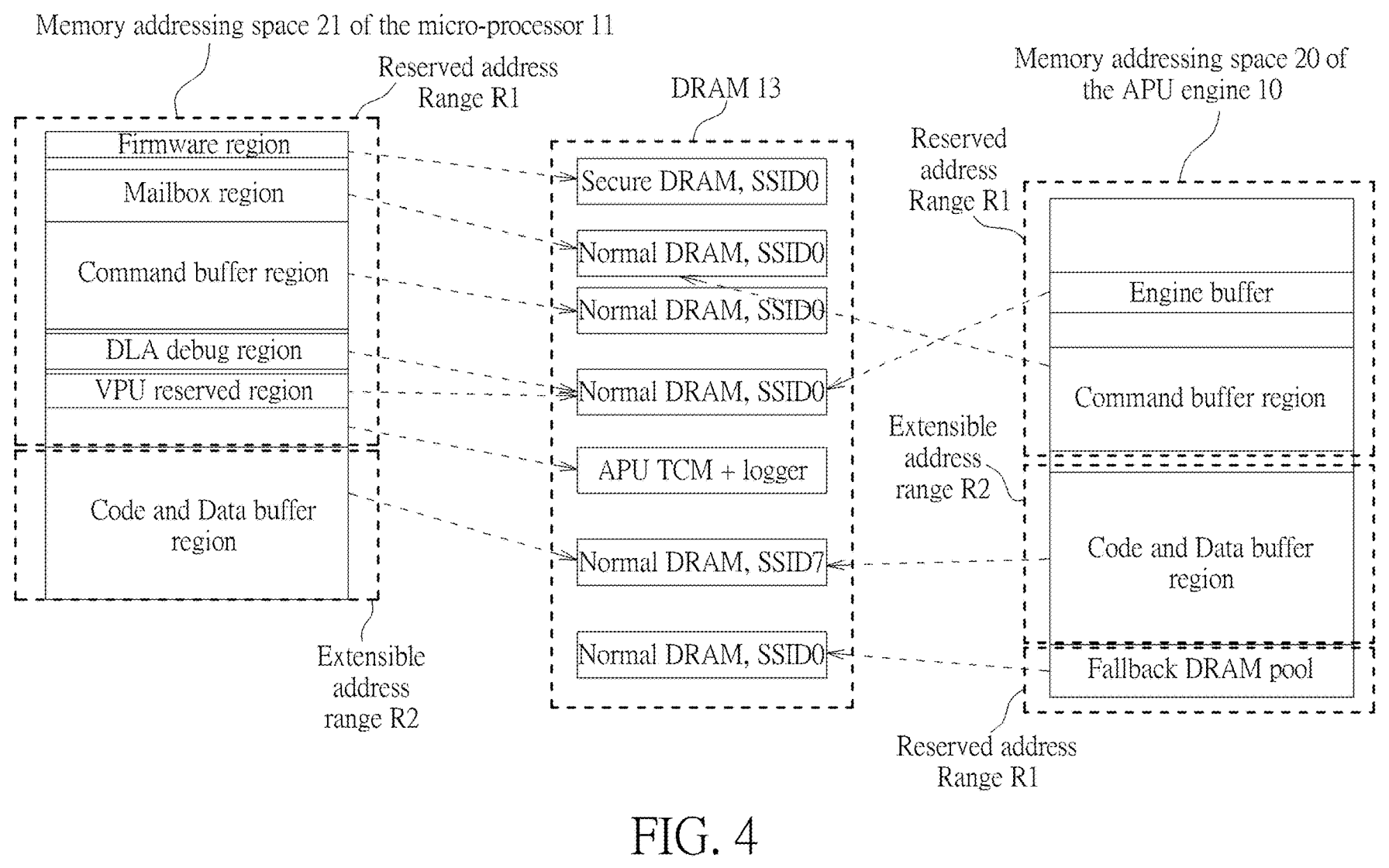

Memory addressing space 20 of
the APU engine 10

Reserved
address
Range R1

Engine buffer

Command buffer region

Extensible
address
range R2

Code and Data buffer
region

Fallback DRAM pool

Reserved address
Range R1

DRAM 13

Secure DRAM, SSID0

Normal DRAM, SSID0

Normal DRAM, SSID0

Normal DRAM, SSID0

APU TCM + logger

Normal DRAM, SSID7

Normal DRAM, SSID0

Memory addressing space 21 of the micro-processor 11

Reserved address
Range R1

Firmware region

Mailbox region

Command buffer region

DLA debug region

VPU reserved region

Code and Data buffer
region

Extensible
address
range R2

FIG. 4

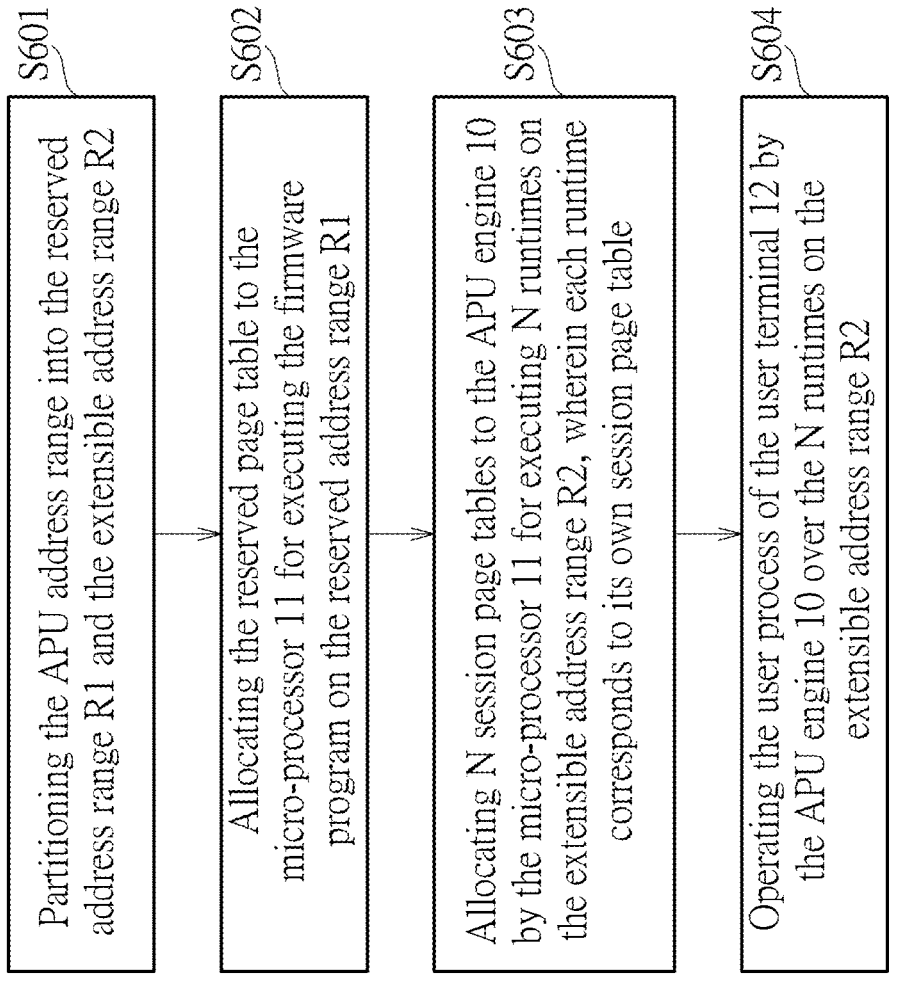

S601

Partitioning the APU address range into the reserved address range R1 and the extensible address range R2

S602

Allocating the reserved page table to the micro-processor 11 for executing the firmware program on the reserved address range R1

S603

Allocating N session page tables to the APU engine 10 by the micro-processor 11 for executing N runtimes on the extensible address range R2, wherein each runtime corresponds to its own session page table

S604

Operating the user process of the user terminal 12 by the APU engine 10 over the N runtimes on the extensible address range R2

FIG. 6

ARTIFICIAL INTELLIGENCE PROCESSING UNIT ADDRESSING METHOD AND ARTIFICIAL INTELLIGENCE PROCESSING UNIT ADDRESSING SYSTEM CAPABLE OF SEGREGATING AND EXTENDING MEMORY ADDRESS RANGE

BACKGROUND

An artificial intelligence processing unit (APU) is a specialized hardware component designed to efficiently handle the computationally intensive tasks associated with artificial intelligence (AI). APUs can be specifically tailored to the unique demands of machine learning algorithms. However, the existing APU architecture cannot provide complete isolation, necessitating the inspection of user IOVA (Input/output Virtual Address) inputs. This additional security measure introduces overhead during AI model execution. To enable direct data transfer between the graphics processing unit (GPU) and APU, the APU must manage multiple page tables, complicating the overall system architecture. Further, large-scale AI models may exceed the addressing capabilities of APU engines, rendering them inoperable on the current system. Additionally, the APU engines may encounter IOVA fragmentation issues, which can negatively affect system performance and stability.

Therefore, developing an APU addressing system capable of segregating and extending a memory address range is a crucial design challenge.

SUMMARY

In an embodiment of the present invention, an artificial intelligence processing unit (APU) addressing method is disclosed. The APU addressing method comprises partitioning an APU address range into a reserved address range and an extensible address range, allocating a reserved page table to a micro-processor of the APU for executing a firmware program on the reserved address range, allocating N session page tables to an APU engine of the APU by the micro-processor for executing N runtimes on the extensible address range, wherein each runtime corresponds to its own session page table, and operating an user process of a user terminal by the APU engine of the APU over the N runtimes on the extensible address range. A runtime is a processing procedure executed by an APU when executing an artificial intelligence (AI) model. The extensible address range is equal to N×S. S is a maximum address range of each runtime. N is a positive integer.

In another embodiment of the present invention, an artificial intelligence processing unit (APU) addressing system is disclosed. The APU addressing system comprises an APU engine configured to perform heterogeneous devices, a micro-processor linked to the APU engine and configured to control the APU engine, a user terminal linked to the APU engine, and a dynamic random-access memory (DRAM) linked to the APU engine, the micro-processor, and the user terminal. The micro-processor and the APU engine are disposed inside an APU. An APU address range is partitioned into a reserved address range and an extensible address range. A reserved page table is allocated to the micro-processor for executing a firmware program on the reserved address range. The micro-processor allocates N session page tables to the APU engine for executing N runtimes on the extensible address range. Each runtime corresponds to its own session page table. The APU engine operates a user process of the user terminal over the N runtimes on the extensible address range. A runtime is a processing procedure executed by an APU when executing an artificial intelligence (AI) model. The extensible address range is equal to N×S. S is a maximum address range of each runtime. N is a positive integer.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is an illustration of memory addressing spaces of a micro-processor and an APU engine associating with memory page tables identified by their page table indices of a dynamic random-access memory (DRAM) of the APU addressing system in FIG. 1.

FIG. 6 is a flow chart of performing an APU addressing method by the APU addressing system in FIG. 1.

DETAILED DESCRIPTION

Figure 1:
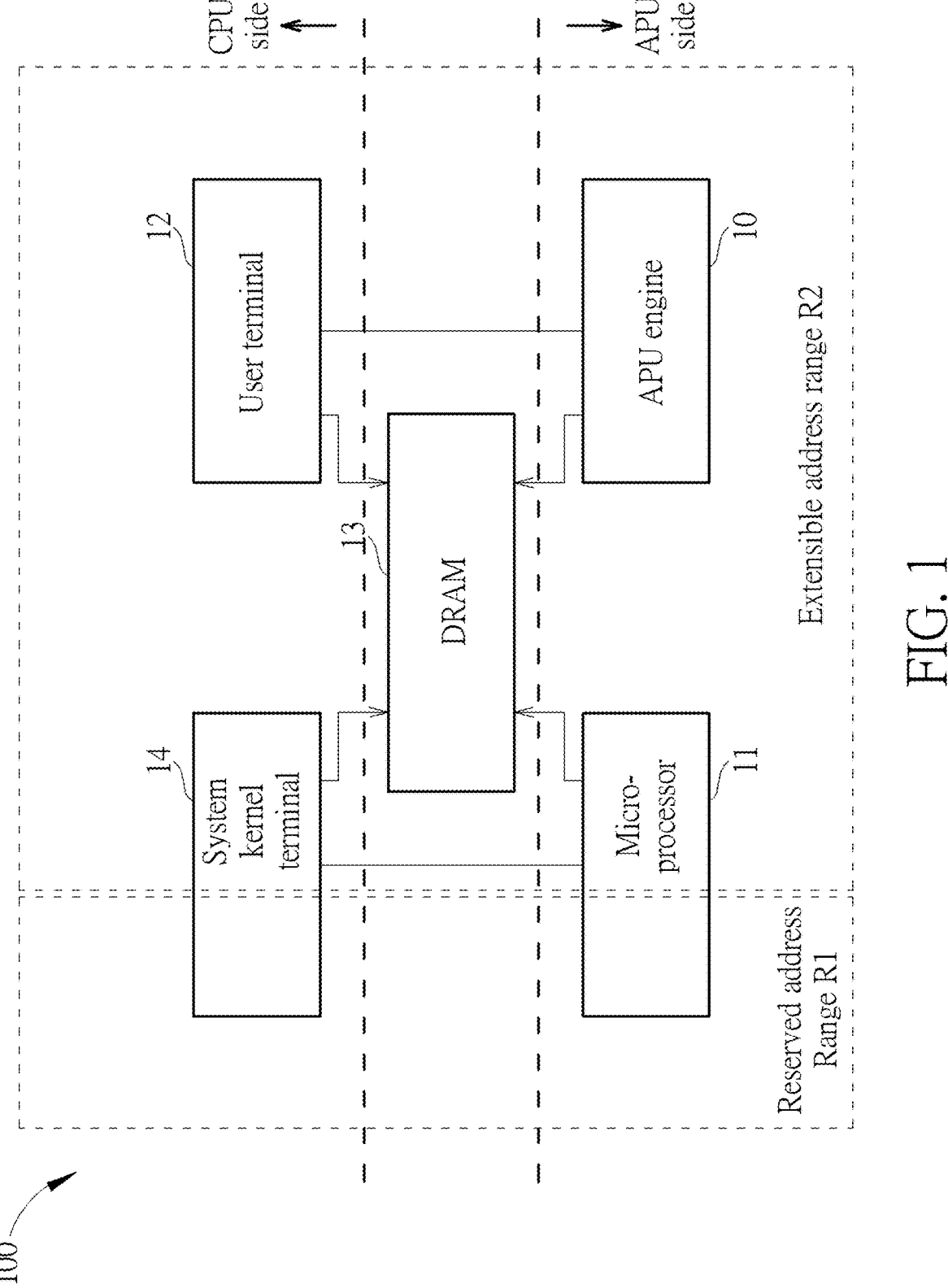
FIG. 1 is a block diagram of an artificial intelligence processing unit (APU) addressing system according to an embodiment of the present invention.

FIG. 1 is a block diagram of an artificial intelligence processing unit (APU) addressing system 100. In the embodiment, an APU is a specialized hardware component designed to efficiently execute computationally intensive tasks associated with artificial intelligence (AI). The APU typically incorporates heterogeneous architectures or devices, combining multiple processing cores with distinct specializations. The APU addressing system 100 can enhance the APU's addressing capabilities by partitioning and extending its memory address range. Here, the APU addressing system 100 includes an APU engine 10, a micro-processor 11, a user terminal, and a dynamic random-access memory (DRAM) 13. The APU engine 10 is configured to perform heterogeneous devices, such as a vision processing unit (VPU) and a deep learning accelerator (DLA). The VPU is a specialized type of microprocessor designed to accelerate computer vision tasks. It can be regarded as a subset of AI accelerators that are specifically optimized for handling the computational demands of image and video processing. The DLA is a specialized hardware unit designed to significantly speed up the training and inference processes of deep neural networks (DNNs). The micro-processor 11 is linked to the APU engine 10 and configured to control the APU engine 10. Here, the micro-processor 11 can be regarded as a control unit for controlling heterogeneous architectures or devices of the APU engine 10. The micro-processor 11 can be an RISC-V (fifth generation of reduced instruction set computing architecture) microprocessor configured to manage and coordinate components of the APU engine 10. The APU engine 10 can be configured to access a larger memory space than it could directly address. The user terminal 12 is linked to the APU engine 10. The user terminal 12 can be a programmable user space for programming a user process. The DRAM 13 is linked to the APU engine 10, the micro-processor 11, and the user terminal 12. Further, the APU addressing system 100 can include a system kernel terminal 14. The system kernel terminal 14 is linked to the micro-processor 11. The system kernel terminal 14 can be regarded as a core component of an operating system (OS). It can manage computer's hardware resources and provide services to other system software. Briefly, in the APU addressing system 100, the micro-processor 11 and the APU engine 10 are disposed inside an APU. An APU address range is partitioned into a reserved address range R1 and an extensible address range R2. A reserved page table is allocated to the micro-processor 11 for executing a firmware program on the reserved address range R1. The micro-processor 11 allocates N session page tables to the APU engine 10 for executing N runtimes on the extensible address range R2. In the embodiment, each runtime corresponds to its own session page table. The APU engine 10 operates a user process of the user terminal 12 over the N runtimes on the extensible address range R2. The extensible address range R2 is a total available address range equal to N×S. S is a maximum address range of each runtime. N is a positive integer. A runtime is a processing procedure executed by an APU when executing an artificial intelligence (AI) model. By extending the total available address range to N×S, the APU's addressing capabilities are significantly enhanced.

In FIG. 1, as previously mentioned, the system kernel terminal 14 and the user terminal 12 can be categorized as a central processing unit (CPU) side. The micro-processor 11 and the APU engine 10 can be categorized as an APU side. Further, the user terminal 12 can be communicated with the APU engine 10 within the extensible address range R2. The user terminal 12 can be operated under the extensible address range R2 through an input/output virtual addresses (IOVA) format flow. It should be understood that IOVA is a technology used for managing memory access by input/output (I/O) devices. Essentially, the IOVA provides an abstraction layer for I/O devices, allowing them to use virtual addresses to access memory directly, without needing to know the physical addresses. In the APU addressing system 100, the APU engine 10 can be operated under the extensible address range R2 through the IOVA format flow. Further, the reserved address range R1 and the extensible address range R2 are allocated to the system kernel terminal 14. The system kernel terminal 14 can communicate with the micro-processor 11 through a mailbox mechanism (such as transmitting Inter-Processor Interrupt (IPI) information) under the reserved address range R1. The system kernel terminal 14 can be operated under the reserved address range R1 and the extensible address range R2 through the IOVA format flow. The micro-processor 11 can be operated under the reserved address range R1 and the extensible address range R2 through the IOVA flow. IOVA stands for Input/output virtual address. It is a virtual address that the operating system assigns to a physical memory location in DRAM 13. The operating system maintains a mapping between IOVA and the actual physical address of the memory location in DRAM 13. This mapping allows the operating system to manage memory allocation and access control for devices. In FIG. 1, instead of remapping engine virtual addresses (EVA) format to IOVA format, the APU engine 10, the micro-processor 11, the user terminal 12, and the system kernel terminal 14 can address their memory space through the IOVA format flow since the session page table of the extensible address range R2 is changed over N runtimes. In other words, the extensible address range R2 corresponding to the session page table for each runtime is isolated, thereby avoiding intrusive data attacks from other user programs. Further, the user terminal 12 and the APU engine 10 are not authorized to access the reserved address range R1. Therefore, data security of the APU addressing system 100 can be enhanced.

Figure 2:
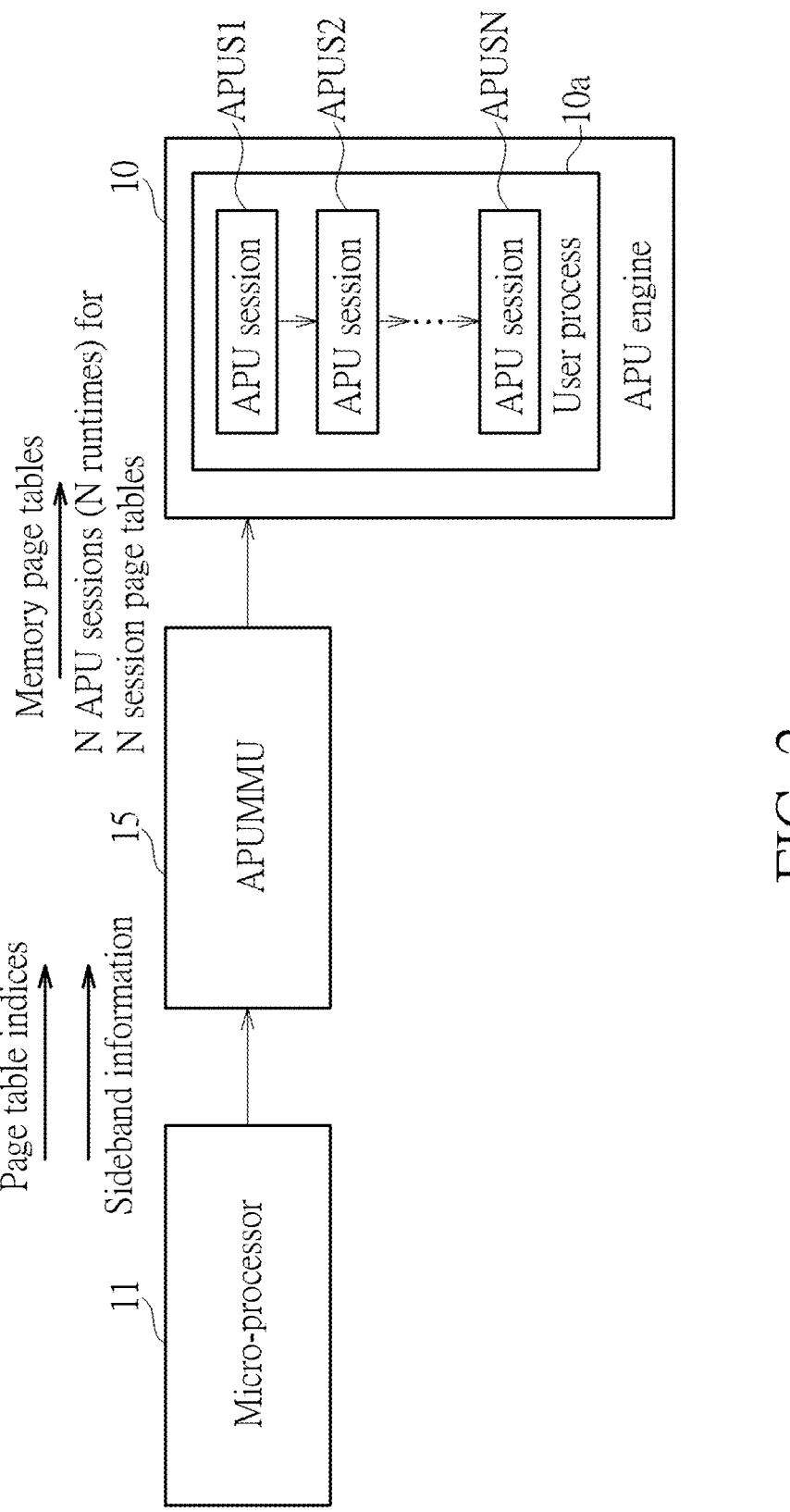
FIG. 2 is an illustration of generating and allocating a plurality of memory page tables to an APU engine of the APU addressing system in FIG. 1.

FIG. 2 is an illustration of generating and allocating a plurality of memory page tables to an APU engine 10 of the APU addressing system 100. First, according to system architecture and configurations, the micro-processor 11 can generate sideband information for identifying the reserved address range R1 and the extensible address range R2. For example, a memory space of the micro-processor 11 can be configured to identify the reserved address range R1 by a first privilege flag "P=1". The memory space of the micro-processor 11 can be configured to identify the extensible address range R2 by a second privilege flag "P=0". The micro-processor 11 can acquire page table indices of the reserved page table and each session page table. Then, an APU memory management unit (APUMMU) 15 can allocate the reserved page table and each session page table according to the sideband information and the page table indices. The APUMMU15 can be a memory management hardware unit specifically designed for the APU. The APUMMU15 can process virtual memory addresses, providing segment-based memory protection mechanisms. In another embodiment, it should be understood that a memory addressing space of the APU engine 10 can include the reserved address range R1 and the extensible address range R2. Therefore, the memory page tables can be assigned to the APU engine 10. For example, the reserved page table can be generated according to its page table index and sideband information (first privilege flag "P=1") to the APU engine 10 for some debugging processes or read-only processes. The N session page tables can be generated according to their page table indices and sideband information (second privilege flag "P=0") to the APU engine 10 for N runtimes (i.e., activating N APU sessions over time). Specifically, each session page table is allocated to the APU engine 10 over each runtime. For example, in FIG. 2, the APU engine 10 can execute a user process 10a. The user process 10a includes N APU sessions APUS1 to APUSN activated over time. A first session page table can be applied to the APU session APUS1. A second session page table can be applied to the APU session APUS2, and so on. The N$^{th}$ session page table can be applied to the APU session APUSN.

As previously mentioned, the APU engine 10 can include the DLA and the VPU. In an embodiment, a maximum address range of each runtime of the VPU can be equal to 3 G (Giga Bytes). Under the VPU runtime case, since each runtime has its own 3 G address range, when 10 runtimes (N=10) are introduced, a total available address range is equal to 10×3 G=30 G. In another embodiment, a maximum address range of each runtime of the DLA can be equal to 12 G. Under the DLA runtime case, since each runtime has its own 12 G address range, when 10 runtimes (N=10) are introduced, a total available address range is equal to 10×12 G=120 G. In other words, in the APU addressing system 100, the APU engine 10 can have an address range larger than its physical hardware addressing capabilities. As a result, the more sessions of the APU engine 10 are activated, the larger addressing range can be allocated.

Figure 3:
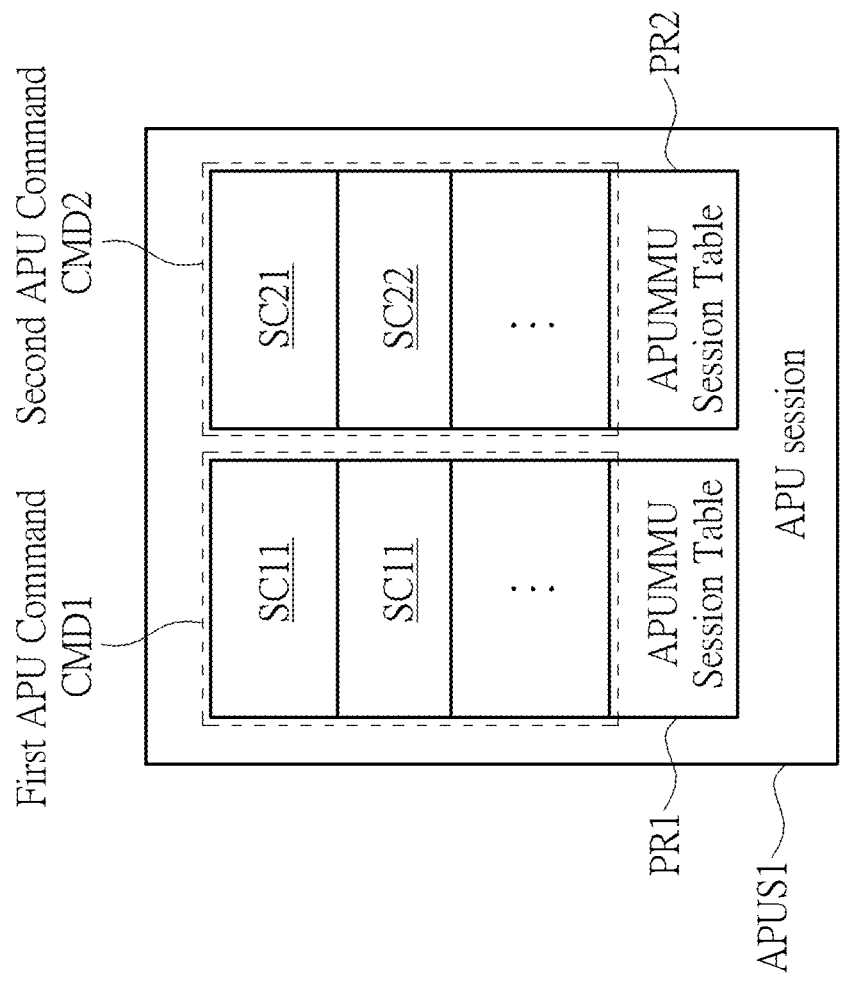
FIG. 3 is a structure of an APU session of the APU addressing system in FIG. 1.

FIG. 3 is a structure of the APU session APUS1 of the APU addressing system 100. The APU session APUS1 includes at least one APU command, such as a first APU command CMD1 and a second APU command CMD2. Here, the "APU command" can be regarded as an APU model for performing a specific function. For example, the first APU command CMD1 can be configured to identify images. The second APU command CMD2 can be configured to identify sound. Further, each APU command can include at least one sub-command for controlling the DLA and/or the VPU (i.e., devices). For example, the first APU command CMD1 includes a sub-command SC11 and a sub-command SC12. The sub-command SC11 can be used for controlling the DLA. The sub-command SC12 can be used for controlling the VPU. The second APU command CMD2 includes a sub-command SC21 and a sub-command SC22. The sub-command SC21 can be used for controlling the DLA. The sub-command SC22 can be used for controlling the VPU. Further, an APUMMU session table can be padded to the tail of APU command. For example, an APUMMU session table PR1 can be padded to the tail of the first APU command CMD1. An APUMMU session table PR2 can be padded to the tail of the second APU command CMD2. As previously mentioned, in the APU addressing system 100, the session page table can be changed over N runtimes of each APU session. As a result, there is no interaction between APU sessions executed at disparate times. Sub-commands executed within a single APU session are isolated and cannot interfere with one another. In other words, the APU addressing system 100 can effectively isolate APU sessions and their subcommands, ensuring that operations within one session cannot interfere with others. This isolation can be achieved through the use of page tables and the ability to dynamically change page tables over runtimes. As a result, the APU addressing system 100 can improve data security.

FIG. 4 is an illustration of memory addressing spaces of the micro-processor 11 and the APU engine 10 associating with memory page tables identified by their page table indices of a dynamic random-access memory (DRAM) of the APU addressing system 100. In FIG. 4, a memory addressing space 21 of the micro-processor 11 includes a plurality of memory regions, such as a firmware region, a mailbox region, a command buffer region, a DLA debug region, a VPU reserved region, and a code and data buffer region. Further, a part of memory regions points to the reserved page table. Another part of memory regions points to a session page table. For example, the firmware region, the mailbox region, the command buffer region, the DLA debug region, and the VPU reserved region can be defined within the reserved address range R1. Specifically, the reserved address range R1 corresponds to a "fixed" reserved page table. Here, the firmware region points to a reserved page table SSID0 of a secure DRAM region. The mailbox region points to the reserved page table SSID0 of a normal DRAM region. The command buffer region points to the reserved page table SSID0 of the normal DRAM region. The DLA debug region points to the reserved page table SSID0 of the normal DRAM region. The VPU reserved region points to the reserved page table SSID0 of the normal DRAM region. Further, the code and data buffer region can be defined within the extensible address range R2. Specifically, the extensible address range R2 corresponds to a "dynamic" session page table. Here, the code and data buffer region points to a session page table SSID7 of the normal DRAM region. It should be understood that the session page table SSID7 can be changed for different runtimes of the APU sessions. In the memory addressing spaces of the micro-processor 11, the code and data buffer region can be configured to perform a debugging tool.

In FIG. 4, a memory addressing space 20 of the APU engine 10 includes a plurality of memory regions, such as an engine buffer, a command buffer region, a code and data buffer region, and a fallback DRAM pool. Further, a part of memory regions points to the reserved page table. The reserved page table is shared with different runtimes of the at least one APU session. Another part of memory regions points to a session page table. Different session page tables are used for different runtimes. Each runtime is associated with one APU session. This one-to-one relationship ensures that each APU session operates within its own memory space, defined by its corresponding session page table. This strict can prevent any potential interference or data conflicts between different APU sessions, even if they are part of the same user process. For example, the engine buffer, the command buffer region, and the fallback DRAM pool can be defined within the reserved address range R1. Specifically, the reserved address range R1 corresponds to a "fixed" reserved page table. Here, the engine buffer points to the reserved page table SSID0 of the normal DRAM region. The command buffer region points to the reserved page table SSID0 of the normal DRAM region. The fallback DRAM pool points to the reserved page table SSID0 of the normal DRAM region. Similarly, the code and data buffer region can be defined within the extensible address range R2. Here, the code and data buffer region points to the session page table SSID7 of the normal DRAM region, which can be changed for different runtimes of the APU sessions.

In the APU addressing system 100, the APU address range is partitioned into the reserved address range and the extensible address range according to a boundary previously determined. For example, the boundary can be pre-determined as 1 G. In IOVA view of the micro-processor 11, the reserved address range R1 is smaller than the boundary (<1 G). The extensible address range R2 is greater than or equal to the boundary ($\geq$1 G). In the embodiment, the APU address range can be determined according to physical hardware's addressing capabilities of the APU engine 10. In another embodiment, the APU address range can be larger than the physical hardware addressing capabilities of the APU engine 10. Any technology of hardware modification falls into the scope of the present invention.

Figure 5:
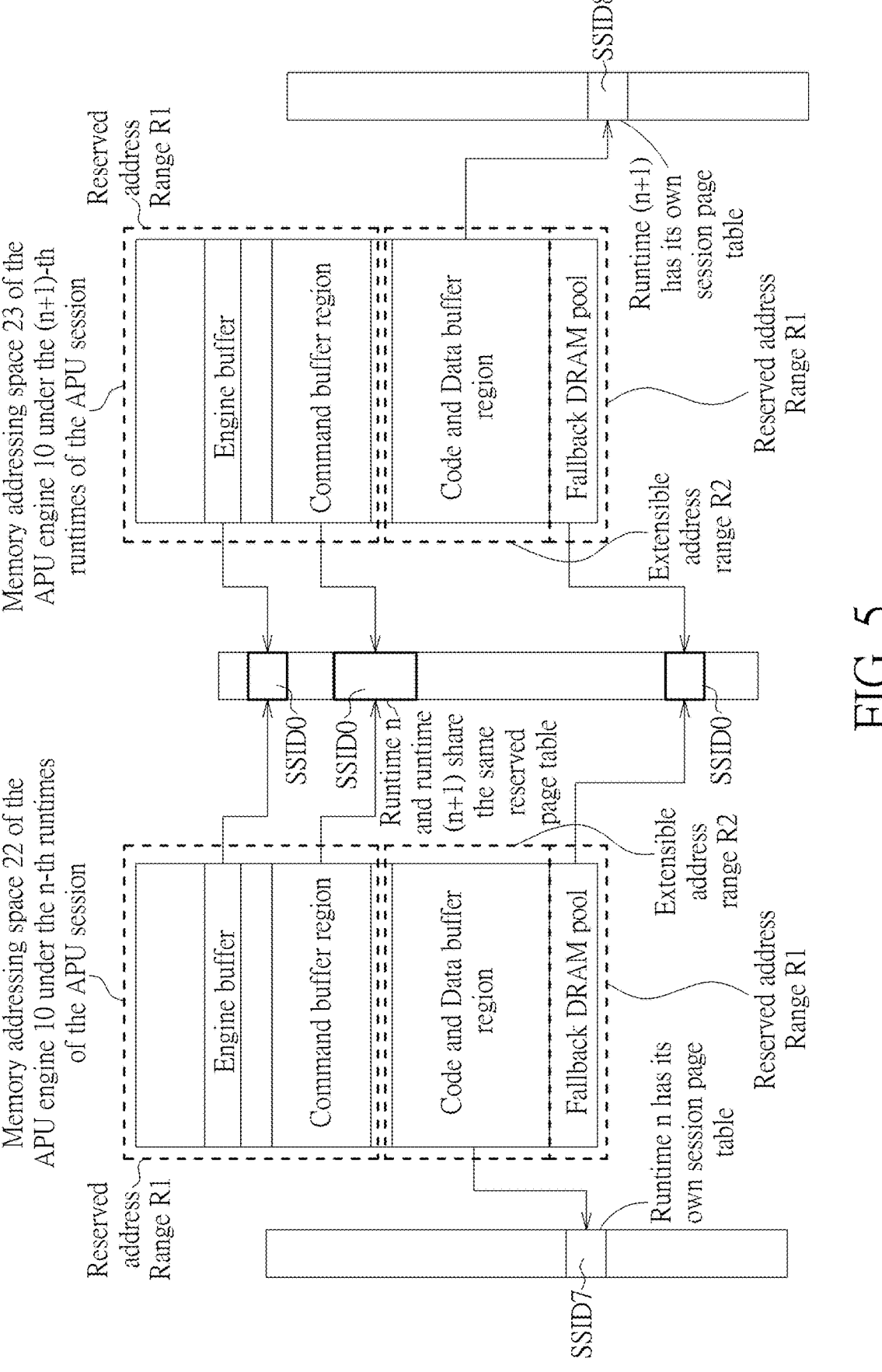
FIG. 5 is an illustration of memory addressing spaces of two different runtimes of APU sessions associating with memory page tables identified by their page table indices of the DRAM of the APU addressing system in FIG. 1.

FIG. 5 is an illustration of memory addressing spaces of two different runtimes of APU sessions associating with memory page tables identified by their page table indices of the DRAM of the APU addressing system 100. For simplicity, the nth runtime of the APU session and the $(n+1)^{th}$ runtime of the APU session are introduced. In a memory addressing space 22 of the APU engine 10 under the nth runtime of the APU session, as previously mentioned, the engine buffer, the command buffer region, and the fallback RAM pool are defined within the reserved address range R1 (i.e., <1 G), pointing to the reserved page table SSID0. Similarly, in a memory addressing space 23 of the APU engine 10 under the $(n+1)^{th}$ runtime of the APU session, the engine buffer, the command buffer region, and the fallback RAM pool are defined within the reserved address range R1 (i.e., <1 G), pointing to the reserved page table SSID0. In other words, the nth runtime and the $(n+1)^{th}$ runtime share the same reserved page table SSID0. As a result, the reserved page table SSID0 is fixed for different runtimes of the APU sessions. Further, in the memory addressing space 22 of the APU engine 10 under the nth runtime of the APU session, the code and data buffer region is defined within the extensible address range R2 ($\geq$1 G), pointing to a session page table SSID7. However, in the memory addressing space 23 of the APU engine 10 under the $(n+1)^{th}$ runtime of the APU session, the code and data buffer region is defined within the extensible address range R2 ($\geq$1 G), pointing to a session page table SSID8. In other words, the nth runtime of the APU session has its own session page table SSID7. The $(n+1)^{th}$ runtime of the APU session has its own session page table SSID8. As a result, in the APU addressing system 100, N session page tables are configured to segregate addresses under different runtimes, and configured to extend an available address range of the APU engine 10.

FIG. 6 is a flow chart of performing an APU addressing method by the APU addressing system 100. The APU addressing method includes step S601 to step S604. Any technology or hardware modification falls into the scope of the present invention. Step S601 to step S604 are illustrated below.

Step S601: partitioning the APU address range into the reserved address range R1 and the extensible address range R2;

Step S602: allocating the reserved page table to the micro-processor 11 for executing the firmware program on the reserved address range R1;

Step S603: allocating N session page tables to the APU engine 10 by the micro-processor 11 for executing N runtimes on the extensible address range R2, wherein each runtime corresponds to its own session page table;

Step S604: operating the user process of the user terminal 12 by the APU engine 10 over the N runtimes on the extensible address range R2.

Details of step S601 to step S604 are previously illustrated. Thus, they are omitted here. Briefly, the APU addressing system 100 can effectively address the challenges of memory management and data security for data transactions between the CPU side and the APU side. By partitioning the APU address range, allocating the reserved page table and the session page tables, no interaction (or say, data intrusiveness) is introduced between APU sessions executed at disparate times, or between two APU sessions executed at the same time. Sub-commands executed within the single APU session are isolated and cannot interfere with one another. Therefore, the APU addressing system 100 can provide a robust and secure environment for executing various APU sessions and user processes.

To sum up, the present invention discloses an APU addressing method and an APU addressing system. The APU addressing system can extend the available address range for the APU, allowing for more simultaneous sessions and tasks. The use of reserved and extensible address ranges, along with sideband privilege flags and page table isolation, prevents unauthorized access and data breaches. Further, the APU addressing system allows for dynamic allocation and management of session page tables, enabling efficient resource utilization and address range extension. The APU addressing system can provide a full isolation capability of APU sessions and their subcommands, avoiding cross-session interference from another program. As a result, the APU addressing system offers a robust and efficient technology for managing memory resources and enhancing addressing capabilities in APU devices. This makes it well-suited for handling the demands of large-scale AI models.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An artificial intelligence processing unit (APU) addressing method comprising:

partitioning an APU address range into a reserved address range and an extensible address range;

allocating a reserved page table to a micro-processor for executing a firmware program on the reserved address range;

allocating N session page tables to an APU engine by the micro-processor for executing N runtimes on the extensible address range, wherein each runtime corresponds to its own session page table; and operating a user process of a user terminal by the APU engine over the N runtimes on the extensible address range;

wherein a runtime is a processing procedure executed by an APU when executing an artificial intelligence (AI) model, the extensible address range is equal to N×S, S is a maximum address range of the each runtime, and N is a positive integer.

2. The method of claim 1, further comprising:

configuring a memory space of the micro-processor to identify the reserved address range by a first privilege flag; and configuring the memory space of the micro-processor to identify the extensible address range by a second privilege flag;

wherein the micro-processor is an RISC-V (fifth generation of reduced instruction set computing architecture) microprocessor configured to manage and coordinate components of the APU engine, the APU engine is configured to access a larger memory space than it could directly address, and the user terminal is operated under the extensible address range.

3. The method of claim 1, wherein the APU engine comprises a deep learning accelerator (DLA) and a vision processing unit (VPU), an APU session comprises at least one APU model, and each APU model comprises at least one sub-command for controlling the DLA and/or the VPU.

4. The method of claim 1, further comprising:

generating sideband information by the micro-processor for identifying the reserved address range and the extensible address range; and acquiring page table indices of the reserved page table and each session page table; and allocating the reserved page table and the each session page table by an APU memory management unit according to the sideband information and the page table indices;

wherein the each session page table is allocated to the APU engine over each runtime.

5. The method of claim 1, wherein the APU engine comprises a plurality of memory regions, a part of memory regions points to the reserved page table, the reserved page table is shared with different runtimes, another part of memory regions points to a session page table, and different session page tables are used for different runtimes.

6. The method of claim 1, further comprising:

programming the user process by the user terminal; and communicating the APU engine with the user terminal within the extensible address range;

wherein the user terminal is operated under the extensible address range through an input/output virtual addresses (IOVA) format flow, and the APU engine is operated under the extensible address range through the IOVA format flow.

7. The method of claim 1, further comprising:

providing a system kernel terminal for performing an operating system (OS), wherein the reserved address range and the extensible address range are allocated to the system kernel terminal; and communicating the system kernel terminal with the micro-processor through a mailbox mechanism for transmitting Inter-Processor Interrupt (IPI) information under the reserved address range, wherein the system kernel terminal is operated under the reserved address range and the extensible address range through an input/output virtual addresses (IOVA) format flow, and the micro-processor is operated under the reserved address range and the extensible address range through the IOVA flow.

8. The method of claim 1, wherein the micro-processor comprises a plurality of memory regions, a part of memory regions points to the reserved page table, another part of memory regions points to a session page table, and configured to perform a debugging tool.

9. The method of claim 1, wherein partitioning the APU address range into a reserved address range and an extensible address range comprises:

partitioning the APU address range into the reserved address range and the extensible address range according to a boundary previously determined;

wherein the reserved address range is smaller than the boundary, the extensible address range is greater than or equal to the boundary, and the APU address range is determined according to hardware's addressing capability of the APU engine.

10. The method of claim 1, wherein the N session page tables are configured to segregate addresses under different runtimes, and configured to extend an available address range of the APU engine.

11. An artificial intelligence processing unit (APU) system comprising:

an APU engine configured to perform heterogeneous devices;

a micro-processor linked to the APU engine and configured to control the APU engine;

a user terminal linked to the APU engine; and a dynamic random-access memory (DRAM) linked to the APU engine, the micro-processor, and the user terminal;

wherein the micro-processor and the APU engine are disposed inside an APU, an APU address range is partitioned into a reserved address range and an extensible address range, a reserved page table is allocated to the micro-processor for executing a firmware program on the reserved address range, the micro-processor allocates N session page tables to the APU engine for executing N runtimes on the extensible address range, each runtime corresponds to its own session page table, the APU engine operates a user process of the user terminal over the N runtimes on the extensible address range, a runtime is a processing procedure executed by the APU when executing an artificial intelligence (AI) model, the extensible address range is equal to N×S, S is a maximum address range of the each runtime, and N is a positive integer.

12. The system of claim 11, wherein a memory space of the micro-processor is configured to identify the reserved address range by a first privilege flag, the memory space of the micro-processor is configured to identify the extensible address range by a second privilege flag, the micro-processor is an RISC-V (fifth generation of reduced instruction set computing architecture) microprocessor configured to manage and coordinate components of the APU engine, the APU engine is configured to access a larger memory space than it could directly address, and the user terminal is operated under the extensible address range.

13. The system of claim 11, wherein the APU engine comprises a deep learning accelerator (DLA) and a vision processing unit (VPU), an APU session comprises at least one APU model, and each APU model comprises at least one sub-command for controlling the DLA and/or the VPU.

14. The system of claim 11, wherein the micro-processor generates sideband information for identifying the reserved address range and the extensible address range, the micro-processor acquires page table indices of the reserved page table and each session page table, an APU memory management unit allocates the reserved page table and the each session page table according to the sideband information and the page table indices, and the each session page table is allocated to the APU engine over each runtime.

15. The system of claim 11, wherein the APU engine comprises a plurality of memory regions, a part of memory regions points to the reserved page table, the reserved page table is shared with different runtimes, another part of memory regions points to a session page table, and different session page tables are used for different runtimes.

16. The system of claim 11, wherein the user terminal is configured to program the user process, the user terminal is communicated with the APU engine within the extensible address range, the user terminal is operated under the extensible address range through an input/output virtual addresses (IOVA) format flow, and the APU engine is operated under the extensible address range through the IOVA format flow.

17. The system of claim 11, further comprising:

a system kernel terminal linked to the micro-processor and configured to perform an operating system (OS);

wherein the reserved address range and the extensible address range are allocated to the system kernel terminal, the system kernel terminal communicates with the micro-processor through a mailbox mechanism for transmitting Inter-Processor Interrupt (IPI) information under the reserved address range, the system kernel terminal is operated under the reserved address range and the extensible address range through an input/output virtual addresses (IOVA) format flow, and the micro-processor is operated under the reserved address range and the extensible address range through the IOVA flow.

18. The system of claim 11, wherein the micro-processor comprises a plurality of memory regions, a part of memory regions points to the reserved page table, another part of memory regions points to a session page table, and configured to perform a debugging tool.

19. The system of claim 11, wherein the APU address range is partitioned into the reserved address range and the extensible address range according to a boundary previously determined, the reserved address range is smaller than the boundary, the extensible address range is greater than or equal to the boundary, and the APU address range is determined according to hardware's addressing capability of the APU engine.

20. The system of claim 11, wherein the N session page tables are configured to segregate addresses under different runtimes, and configured to extend an available address range of the APU engine.

* * * * *